Patented Apr. 1, 1941

2,237,024

UNITED STATES PATENT OFFICE 2,237,024

PAINT

Richard A. Crawford, Akron, Ohio, assignor to The B. F. Goodrich Company, New York, N. Y., a corporation of New York No Drawing. Application May 31, 1939,
Serial No. 276,631

5 Claims. (Cl. 260—734)

This invention relates to paints and especially to chemically inert and weather resistant paints adapted for application to surfaces subjected to corrosive chemicals as well as to ordinary weathering conditions.

It has previously been known that thermoprene dissolved in a volatile solvent carrier produces an excellent paint which dries by evaporation of the solvent to deposit a coating exhibiting the superior quality of being resistant to chemical action, particularly the action of acids and alkalis, but such coatings heretofore have been susceptible to weathering, i. e. progressive deterioration resulting from continued exposure to ordinary outside weather conditions.

I have discovered that by adding cashew nut shell oil to thermoprene paint, I am able to produce a paint exhibiting excellent weathering characteristics together with a high degree of chemical resistance. Widely varying proportions of cashew nut shell oil may be incorporated in thermoprene paints according to this invention, but amounts of the oil in a proportion between 10% and 100% by weight of the thermoprene have usually been employed. Quantities of the oil varying from 15% to 30% by weight of the thermoprene have been found to produce paints exhibiting to a maximum degree all the desired features of chemical resistance, weather resistance, desirable spreading characteristics and the like.

In order to illustrate a balanced paint embodying the principles of this invention, the following examples are given:

Example I

| | Parts by weight |
|---|---|
| Thermoprene | 100 |
| Cashew nut shell oil | 20 |
| Blanc fixe | 150 |
| Titanium dioxide | 150 |
| Xylol | 360 |
| Anhydrous denatured ethyl alcohol | 20 |
| | 800 |

In the preceding example the volatile solvent Xylol is employed as the liquid carrier for the other paint constituents. The alcohol is added to impart the desired viscosity characteristics to the paint and frequently may be omitted entirely. The titanium dioxide is used to give the paint hiding or covering power and may be substituted by lithopone, zinc sulfide or any other well known pigment. Blanc fixe is here used as a filler to give bulk to the paint and may be replaced by finely divided mica, soapstone, glass, silica or any other common filler.

Example II

| | Parts by weight |
|---|---|
| Thermoprene | 100 |
| Cashew nut shell oil | 30 |
| Zinc oxide | 140 |
| Titanium dioxide | 200 |
| Mica | 60 |
| Mineral spirits | 400 |
| Anhydrous denatured ethyl alcohol | 20 |
| | 950 |

In this example, the mineral spirits functions as the liquid carrier for the other constituents of the paint and the zinc oxide, titanium dioxide and mica are used for the purpose, as explained in connection with Example I, of producing a balanced, smooth flowing and durable paint.

In the paints of either of the preceding examples, any color may be obtained by the use of appropriate coloring pigments, and gloss, hardness, flexibility, and such qualities, may be controlled by the use of suitable plasticizers and resins in the usual manner. Similarly, the pigments and fillers specified may be varied or omitted entirely as required to produce a paint having desired characteristics, and the liquid carrier may be any well known volatile organic solvent for the thermoprene or even a non-solvent carrier such as water in which case the water-insoluble constituents will be colloidally dispersed in the water, all of which is well understood in the art. It should be noted, however, that when a non-solvent carrier such as water is employed, the dried paint coating will need be subjected to heat to produce a coherent smooth film. For this reason, volatile organic solvent carriers ordinarily are to be preferred.

The paints of the present invention may be prepared by any well known method. For example, all the ingredients of the paint may be mixed together in a pebble mill or ball mill and subjected to grinding as in ordinary methods of preparing paints; the cashew nut shell oil, pigments and fillers may be milled into thermoprene on a conventional roll mill and the resulting product then dissolved in a solvent; or cashew nut shell oil may be simply stirred into a previously prepared thermoprene paint.

The "thermoprene" employed in the paints herein described and claimed may be any member of the well known class of materials designated by that name and including all rubber isomers having a lesser degree of chemical unsaturation than rubber, such as the rubber isomers prepared, as described in U. S. Patent No. 1,605,180, by treating rubber with compounds of the general formula R—SO₂—X where R represents an organic radical or a hydroxy group and X represents a hydroxy group or chlorine.

It is understood that other modifications of the paint formulae and deviations of the methods of manufacture, as hereinabove described, may be resorted to without departing from the spirit of the invention, and I desire therefore to claim the invention broadly, limited only by the scope of the appended claims.

I claim:

1. A paint comprising thermoprene, cashew nut shell oil and a liquid carrier which dries by evaporation.

2. A paint comprising thermoprene, cashew nut shell oil in a proportion between 10% and 100% by weight of the thermoprene, and a liquid carrier which dries by evaporation.

3. A paint comprising thermoprene, cashew nut shell oil and a liquid carrier comprising a volatile organic solvent in which the thermoprene is soluble.

4. A chemical and weather resistant paint comprising thermoprene, cashew nut shell oil in a proportion between 15% and 30% by weight of the thermoprene, and a liquid carrier comprising a volatile organic solvent in which the thermoprene is soluble.

5. A chemical and weather resistant composition comprising thermoprene and cashew nut shell oil.

RICHARD A. CRAWFORD.